US010645058B2

(12) United States Patent
Ishikawa (10) Patent No.: US 10,645,058 B2
(45) Date of Patent: May 5, 2020

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Akira Ishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 15/658,462

(22) Filed: Jul. 25, 2017

(65) Prior Publication Data
US 2018/0041469 A1 Feb. 8, 2018

(30) Foreign Application Priority Data

Aug. 4, 2016 (JP) ................................ 2016-154024

(51) Int. Cl.
*H04L 29/12* (2006.01)
*H04L 12/24* (2006.01)

(52) U.S. Cl.
CPC ...... *H04L 61/2015* (2013.01); *H04L 41/0686* (2013.01)

(58) Field of Classification Search
CPC .................. H04L 61/2015; H04L 41/0686
See application file for complete search history.

(56) References Cited

U.S. PATENT DOCUMENTS

| 7,103,648 B1* | 9/2006 | Burrows | H04L 61/2015 709/220 |
| 2005/0198344 A1* | 9/2005 | Fujita | H04L 12/2807 709/231 |
| 2012/0023220 A1* | 1/2012 | Ma | H04L 43/50 709/224 |
| 2017/0019546 A1* | 1/2017 | Tse | G03G 15/5016 |

FOREIGN PATENT DOCUMENTS

JP      2015186257 A    10/2015

* cited by examiner

*Primary Examiner* — Nasser M Goodarzi
*Assistant Examiner* — Adil Ocak
(74) *Attorney, Agent, or Firm* — Rossi, Kimms & McDowell LLP (57) ABSTRACT

An information processing apparatus obtains an IP address from a DHCP server, and in the case where the obtainment of an IP address from the DHCP server has failed, determines whether or not to continue to use an IP address used previously, on the basis of a setting in the information processing apparatus.

15 Claims, 7 Drawing Sheets

INFORMATION PROCESSING APPARATUS, CONTROL METHOD THEREOF, AND STORAGE MEDIUM

BACKGROUND OF THE INVENTION

Field of the Invention

The present invention relates to an information processing apparatus that obtains an IP address through DHCP, a control method thereof, and a storage medium.

Description of the Related Art

An information processing apparatus making an Internet Protocol (IP) connection to a network requires an IP address to be set. Manually setting IP addresses for individual information processing apparatuses is burdensome, and thus a method that uses the Dynamic Host Configuration Protocol (DHCP) to dynamically assign IP addresses from a DHCP server is used. The DHCP server manages which IP addresses are assigned to the information processing apparatuses. Sometimes the number of information processing apparatuses requesting an IP address to be assigned is greater than the number of IP addresses that the DHCP server is able to assign. In such a case, the DHCP server may reassign the same IP address to a different information processing apparatus, depending on the state of assignment requests from the information processing apparatuses. The DHCP server may also reject an assignment in the case where many information processing apparatuses have requested assignments simultaneously.

As such, an information processing apparatus basically can only use an IP address assigned by the DHCP server for a permitted period. If an information processing apparatus continues to use an IP address for longer than the permitted period despite that same IP address being reassigned to another information processing apparatus, the other information processing apparatus will ultimately operate using that same IP address. Proper communication cannot be carried out if IP addresses overlap within the same network in this manner. Japanese Patent Laid-Open No. 2015-186257 proposes a technique that, in the case where IP addresses overlap after being assigned using DHCP, displays an indication that the IP addresses overlap in an operating unit.

However, this conventional technique poses the following problem. There are cases where the DHCP server operations are unstable, the connection with the DHCP server is unstable, and so on. For example, if a cheap access point is simply being used as a DHCP server as well, the device operating as the DHCP server may degrade over time and malfunction, or a problem with the network configuration may result in an unstable connection with the DHCP server. Even if the environment is one in which the DHCP server operations are unstable, it is still necessary for devices, such as office printers that lose their opportunities to print when connection problems arise, to be able to connect to the network to the greatest extent possible.

Accordingly, a configuration is conceivable in which, when there is a problem with the DHCP server, the IP address previously assigned by the DHCP server is reused rather than being released. However, this is problematic in the case where the DHCP server has assigned the same IP address to another information device, and thus such operations cannot be carried out in such a case.

SUMMARY OF THE INVENTION

The present invention enables realization of a system in which a favorable connection to a network can be made even in an environment in which the operations of a DHCP server are unstable.

One aspect of the present invention provides an information processing apparatus that uses an IP address obtained from a DHCP server, the apparatus comprising: an obtainment unit configured to obtain an IP address from the DHCP server; and a determination unit configured to, in the case where the obtainment of an IP address from the DHCP server has failed, determine whether or not to continue using an IP address used previously, on the basis of a setting in the information processing apparatus.

Another aspect of the present invention provides a method of controlling an information processing apparatus that uses an IP address obtained from a DHCP server, the method comprising: obtaining an IP address from the DHCP server; and in the case where the obtainment of an IP address from the DHCP server has failed, determining whether or not to continue to use an IP address used previously, on the basis of a setting in the information processing apparatus.

Still another aspect of the present invention provides a non-transitory computer-readable storage medium storing a computer program for causing a computer to execute a method of controlling an information processing apparatus that uses an IP address obtained from a DHCP server, the method comprising: obtaining an IP address from the DHCP server; and in the case where the obtainment of an IP address from the DHCP server has failed, determining whether or not to continue to use an IP address used previously, on the basis of a setting in the information processing apparatus.

Further features of the present invention will be apparent from the following description of an exemplary embodiment with reference to the attached drawings.

DESCRIPTION OF THE EMBODIMENTS

Embodiments of the present invention will now be described in detail with reference to the drawings. It should be noted that the relative arrangement of the components, the numerical expressions, and numerical values set forth in the embodiments do not limit the scope of the present invention unless it is specifically stated otherwise.

First Embodiment

System Configuration

Hereinafter, a first embodiment of the present invention will be described. Although the present embodiment describes a multifunction peripheral (MFP) as an example of an information processing apparatus, the present invention provides a technique that can be applied in any information processing apparatus, even aside from a multifunction peripheral. Additionally, although an example of the present invention being applied in an office will be described, the present invention provides a technique that can be applied in a system of any scale located on the internet. The state of connections between an MFP, a DHCP server, and a client PC according to the present embodiment will be described first with reference to FIG. 1.

Figure 1:
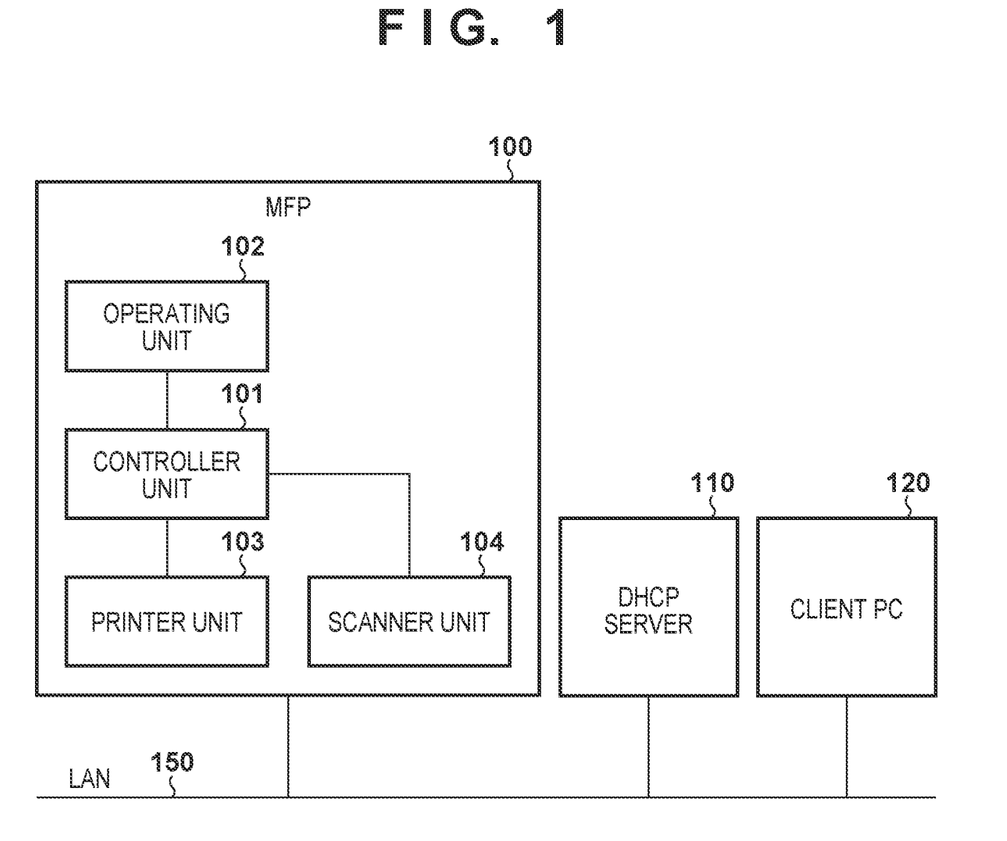
FIG. 1 is a block diagram illustrating the state of a connection between an MFP and a DHCP server according to an embodiment.

This system is configured including an MFP 100, a DHCP server 110, and a client PC 120. These devices are connected over a local area network (LAN) 150. The MFP 100 includes a controller unit 101, an operating unit 102, a printer unit 103, and a scanner unit 104.

The operating unit 102 is an interface that controls inputs and outputs from and to a user. The printer unit 103 outputs electronic data to a recording medium such as paper or a sheet. The scanner unit 104 reads and converts a recording medium into electronic data. The operating unit 102, the printer unit 103, and the scanner unit 104 are connected to the controller unit 101, and realize the functionality of a multifunction peripheral under the control of the controller unit 101. In other words, the controller unit 101 controls the MFP 100 as a whole.

The DHCP server 110 assigns IP addresses to the MFP 100 and the client PC 120 over the LAN 150. The client PC 120 transmits a print job to the MFP 100 over the LAN 150. Note that the present invention is not limited to the configuration illustrated in FIG. 1. For example, the system may be configured to include other devices, and the MFP may be configured to include other constituent elements as well.

Configuration of Controller Unit

Figure 2:
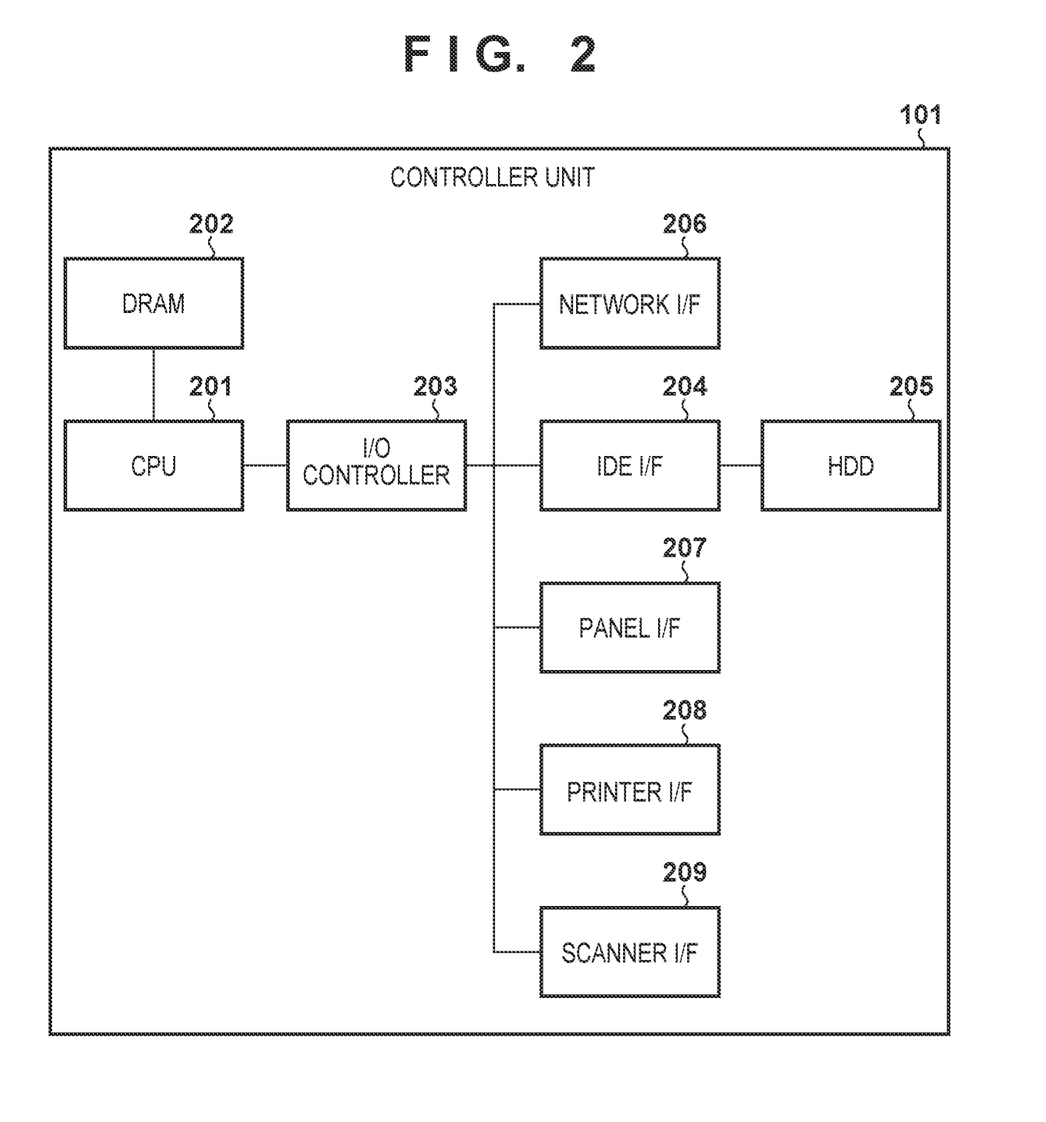
FIG. 2 is a diagram illustrating the internal configuration of a controller unit of the MFP according to an embodiment.

Next, the configuration of the controller unit 101 of the MFP 100 will be described in detail with reference to FIG. 2. The controller unit 101 includes a CPU 201, DRAM 202, an I/O controller 203, an integrated device electronics (IDE) I/F 204, an HDD 205, a network I/F 206, a panel I/F 207, a printer I/F 208, and a scanner I/F 209.

The CPU 201 carries out the primary computational processes within the controller. The CPU 201 is connected to the DRAM 202 by a bus. The DRAM 202 is used by the CPU 201 as a working memory for temporarily storing program data expressing computational commands as the CPU 201 carries out computations, data to be processed, and so on.

Furthermore, the CPU 201 is connected to the I/O controller 203 by the bus. The I/O controller 203 makes inputs and outputs to various devices in response to instructions from the CPU 201. The I/O controller 203 is connected to the IDE I/F 204, and the HDD 205 is connected to the IDE I/F 204. The CPU 201 uses the HDD 205 for the long-term storage of programs for realizing the functions of the MFP 100 and document data that has been read.

The network I/F 206 is connected to the I/O controller 203, and the CPU 201 controls communication over the LAN 150 via the network I/F 206. The panel I/F 207 is connected to the I/O controller 203, and via the panel I/F 207, the CPU 201 controls inputs from and outputs to the user made through the operating unit 102. The printer I/F 208 is connected to the I/O controller 203, and via the printer I/F 208, the CPU 201 controls a process for outputting a recording medium utilizing the printer unit 103. The scanner I/F 209 is connected to the I/O controller 203, and via the scanner I/F 209, the CPU 201 controls a process for reading an original utilizing the scanner unit 104.

Control carried out when implementing a copy function will be described here. First, the CPU 201 loads program data from the HDD 205 into the DRAM 202 via the IDE I/F 204. In accordance with the program loaded into the DRAM 202, the CPU 201 detects, via the panel I/F 207, a copy instruction made by the user through the operating unit 102. Upon detecting the copy instruction, the CPU 201 receives the original from the scanner unit 104 as electronic data via the scanner I/F 209, and stores that electronic data in the DRAM 202. The CPU 201 executes image processing, such as color conversion processing, suited to output on the image data stored in the DRAM 202. The CPU 201 transfers the image data stored in the DRAM 202 to the printer unit 103 via the printer I/F 208, and carries out a process for outputting that data onto the recording medium.

Next, control performed when carrying out PDL printing will be described. First, the client PC 120 issues a print instruction over the LAN 150. The CPU 201 loads program data from the HDD 205 into the DRAM 202 via the IDE I/F 204, and detects the print instruction via the network I/F 206 in accordance with the program loaded into the DRAM 202. Upon detecting a PDL transmission instruction, the CPU 201 receives print data via the network I/F 206 and stores the print data in the HDD 205 via the IDE I/F 204. When the print data has been successfully stored, the CPU 201 expands the print data stored in the HDD 205 as image data in the DRAM 202. The CPU 201 executes image processing, such as color conversion processing, suited to output on the image data stored in the DRAM 202. The CPU 201 transfers the image data stored in the DRAM 202 to the printer unit 103 via the printer I/F 208, and carries out a process for outputting that data onto the recording medium.

Software Configuration

Figure 3:
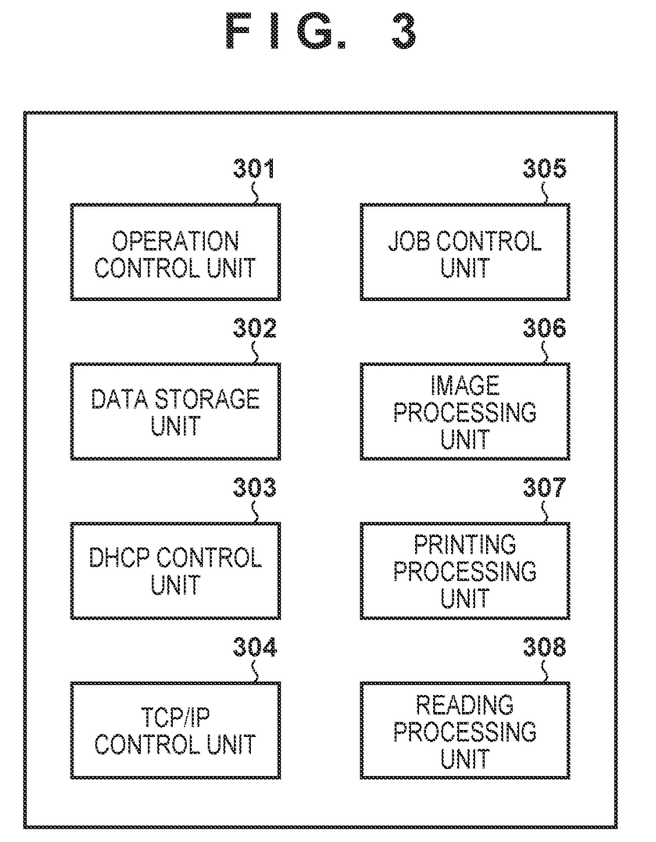
FIG. 3 is a block diagram illustrating software executed within the controller of the MFP according to an embodiment.

Next, the configuration of software (software components) executed by the controller unit 101 of the MFP 100 will be described with reference to FIG. 3. The software executed by the controller unit 101 is realized, for example, by the CPU 201 loading programs stored in the HDD 205 into the DRAM 202 and executing those programs.

As a software configuration, the MFP 100 includes an operation control unit 301, a data storage unit 302, a DHCP control unit 303, a TCP/IP control unit 304, a job control unit 305, an image processing unit 306, a printing processing unit 307, and a reading processing unit 308. The operation control unit 301 displays screen images for the user in the operating unit 102, and detects user operations and executes processes associated with screen components such as buttons displayed in the screen. The data storage unit 302 stores data in and reads data out from the HDD 205 in response to requests from other software components. For example, in the case where the user wishes to change a device setting, the operation control unit 301 detects content input by the user into the operating unit 102, and the data storage unit 302 stores that content as a setting value in the HDD 205 in response to a request from the operation control unit 301.

The DHCP control unit 303 controls processing pertaining to the obtainment of IP addresses in accordance with the protocol defined as DHCP in RFC 2131. The TCP/IP control unit 304 carries out processing for transmitting and receiving network packets via the network I/F 206, in response to instructions from the other software components. For example, after determining a packet to be transmitted in accordance with the protocol, the DHCP control unit 303 requests the TCP/IP control unit 304 to carry out the actual process of transmitting the packet.

The job control unit 305 controls the execution of jobs in response to instructions from other software components. The image processing unit 306 processes the image data into a format suited to the application thereof in accordance with instructions from the job control unit 305. The printing processing unit 307 prints and outputs an image onto the recording medium via the printer I/F 208 in response to instructions from the job control unit 305. The reading processing unit 308 reads a provided original via the scanner I/F 209 in response to instructions from the job control unit 305.

For example, in the case where a copy function is executed, the operation control unit 301 detects a request to start the copy function, and instructs the job control unit 305 to make a copy. The job control unit 305 instructs the reading processing unit 308 to read an original, thus obtaining a scanned image. The job control unit 305 instructs the image processing unit 306 to convert the scanned image into a format suited to printing. The job control unit 305 instructs the printing processing unit 307 to carry out the print, and the resulting copy is outputted by the printer unit 103.

Screen Examples

Figure 4:
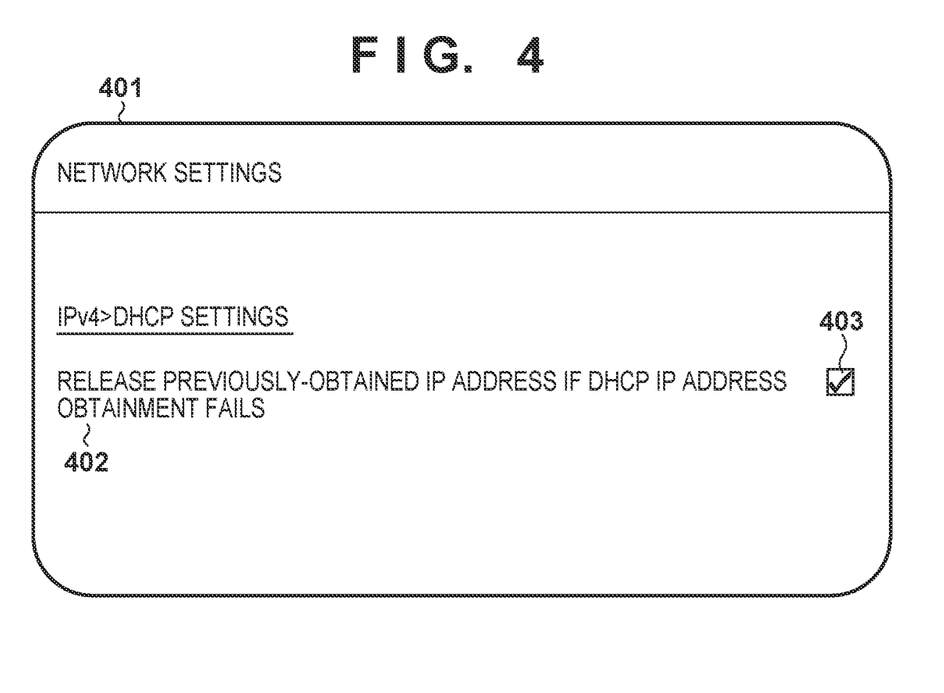
FIG. 4 is a diagram illustrating an example of a settings screen according to an embodiment.
Figure 5:
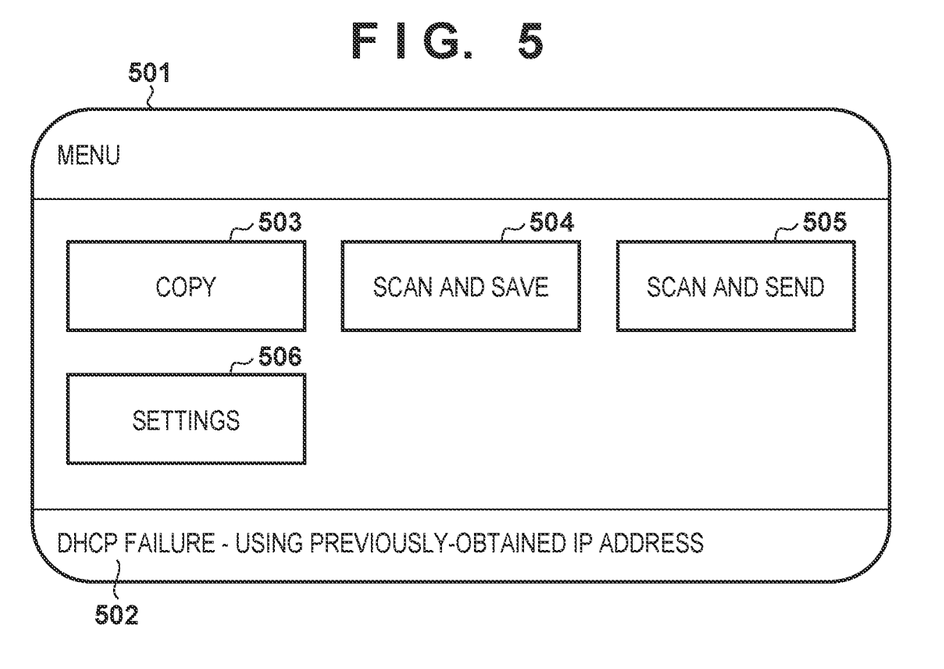
FIG. 5 is a diagram illustrating an example of a notification screen according to an embodiment.

Next, examples of screens displayed in the operating unit 102 of the MFP 100 will be described with reference to FIGS. 4 and 5. First, a network settings screen 401 will be described with reference to FIG. 4.

The network settings screen 401 is configured to include a setting item 402. The setting item 402 is an item for the user to input a setting for, in the case where the obtainment of an IP address through DHCP has failed, whether or not to release the previously-obtained IP address. This setting can be made using a check box indicated by 403, for example. Checking the check box makes a setting for releasing IP address, and removing the checkmark makes a setting for not releasing the IP address.

Next, a menu screen 501 will be described with reference to FIG. 5. The menu screen 501 is a screen through which the user instructs various functions provided by the MFP 100 to be executed. The menu screen 501 is configured including an information notification area 502, and buttons 503 to 506 for executing various types of functions.

The information notification area 502 is an area for communicating information about events in the MFP 100 to the user. For example, in FIG. 5, a notification indicating that the previously-obtained IP address is being used due to a DHCP failure is displayed. The button 503 is utilized by the user to specify a copy function. The button 504 is utilized by the user to specify a function for scanning and storing data. The button 505 is utilized by the user to specify a function for scanning and transmitting data. The button 506 is utilized by the user to instruct device settings to be changed. The network settings screen 401 can be displayed by pressing the button 506 to select a displayed settings classification.

Obtainment Process

Figure 6:
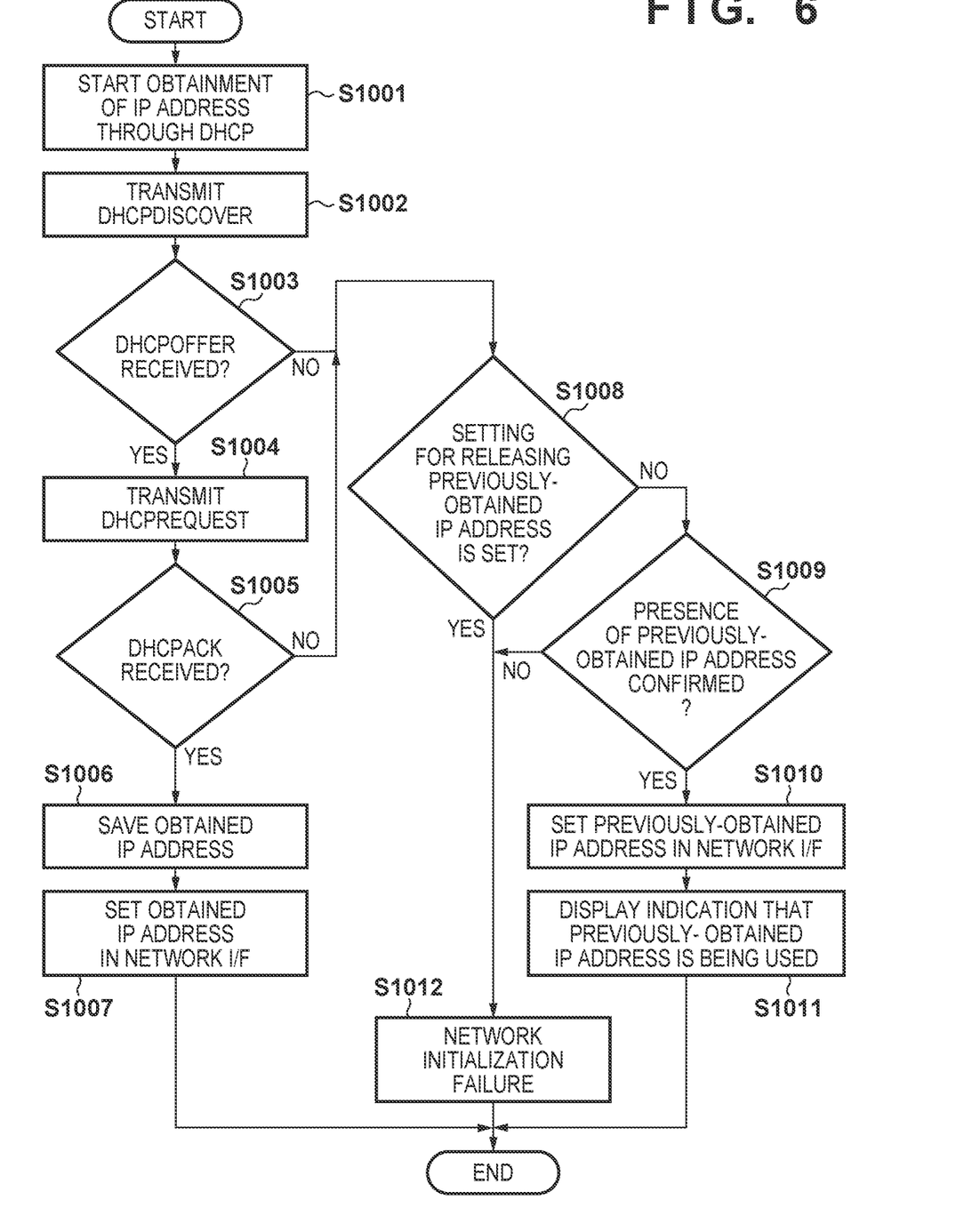
FIG. 6 is a flowchart illustrating a processing sequence performed by the MFP according to an embodiment.

Next, a processing sequence according to the present embodiment, carried out by the MFP 100 in the case where an IP address is obtained utilizing DHCP, will be described with reference to FIG. 6. The processing described hereafter is realized by, for example, the CPU 201 loading a program stored in the HDD 205 into the DRAM 202 and executing that program. Additionally, DHCPDISCOVER, DHCPOFFER, DHCPREQUEST, and DHCPACK used in the drawings and the descriptions are all network packets defined in RFC 2131 as Request for Comments.

In S1001, the CPU 201 detects that a network initialization process has been started, and starts the process for obtaining an IP address through DHCP. The network initialization process is carried out in a variety of circumstances, such as when the power is turned on, network settings have been changed by the user, the lease period of an IP address assigned through DHCP ends, and so on. Additionally, although other methods for assigning an IP address exist, such as setting a static IP address or using another protocol such as Auto IP (Automatic Private IP Addressing), it is assumed here that a process for obtaining an IP address through DHCP has been selected.

In S1002, the CPU 201 transmits DHCPDISCOVER as a process for searching for a DHCP server. This is a request, made over the LAN 150, for a response from a reachable DHCP server. Next, in S1003, the CPU 201 determines whether or not DHCPOFFER has been received as a proposed IP address. If the DHCPOFFER is received, the process moves to S1004, whereas if the DHCPOFFER is not received, the process moves to S1008. The DHCPOFFER being received indicates that the DHCP server 110 has notified the MFP 100 of a potential IP address to be assigned in response to the DHCPDISCOVER from the MFP 100. The DHCPOFFER not being received indicates that a preset standby time has passed after the MFP 100 has transmitted the DHCPDISCOVER.

In S1004, the CPU 201 transmits a DHCPREQUEST as an IP address assignment request. This is a request for permission for the MFP 100 to utilize the IP address communicated by the DHCP server 110 through the DHCPOFFER. Next, in S1005, the CPU 201 determines whether or not a DHCPACK has been received from the DHCP server 110 as a notification that the utilization is permitted. If the DHCPACK is received, the process moves to S1006, whereas if the DHCPACK has not been received, the process moves to S1008. The DHCPACK being received indicates that the DHCP server 110 has assigned the IP address to the MFP 100. The DHCPACK not being received indicates that the DHCP server 110 has rejected the MFP 100 and transmitted a DHCPNAK, or that a pre-set standby time has passed after the MFP 100 has transmitted the DHCPREQUEST.

In S1006, the CPU 201 obtains the IP address assigned by the DHCP server 110 and stores the IP address in the HDD 205. Furthermore, the CPU 201 stores a lease period included in the DHCPACK in the HDD 205. The "lease period" indicates a period for which the assigned IP address can be used. Next, in S1007, the CPU 201 sets the IP address assigned by the DHCP server 110 in the network I/F 206.

Meanwhile, in S1008, the CPU 201 obtains, from the HDD 205, a setting value corresponding to the setting item 402, which is a setting made in the case where the IP address obtainment has failed. The CPU 201 then determines whether or not the setting is a setting for releasing the previously-obtained IP address. In the case where the setting is for releasing, the process moves to S1012, whereas in the case where the setting is not for releasing, the process moves to S1009.

In S1009, the CPU 201 confirms whether or not the IP address stored during the previous successful obtainment is present in the HDD 205. In the case where the IP address is not present, the process moves to S1012, whereas in the case where the IP address is present, the process moves to S1010. Here, a memory address in the HDD 205 corresponding to the storage location of the confirmed IP address information is the same as the memory address in the HDD 205 corresponding to the storage location of the IP address information stored in S1006.

In S1010, the CPU 201 sets the IP address stored during the previous successful obtainment and read out from the HDD 205 in S1009 in the network I/F 206. Furthermore, in S1011, the CPU 201 functions as a reporting unit, and displays an indication, in the information notification area 502 of the menu screen 501, that the address obtainment through DHCP failed and the IP address from the previous successful obtainment will be used. The process then ends. Note that the reporting method is not limited to a method of displaying information in a display unit of the operating unit 102, and a method that transmits an email to a pre-registered email address of an administrator may be used instead.

On the other hand, in S1012, the CPU 201 determines that the IP address assignment has failed, interrupts the process of obtaining an IP address, releases the previously-obtained IP address, and ends the process.

Extension Process

Figure 7:
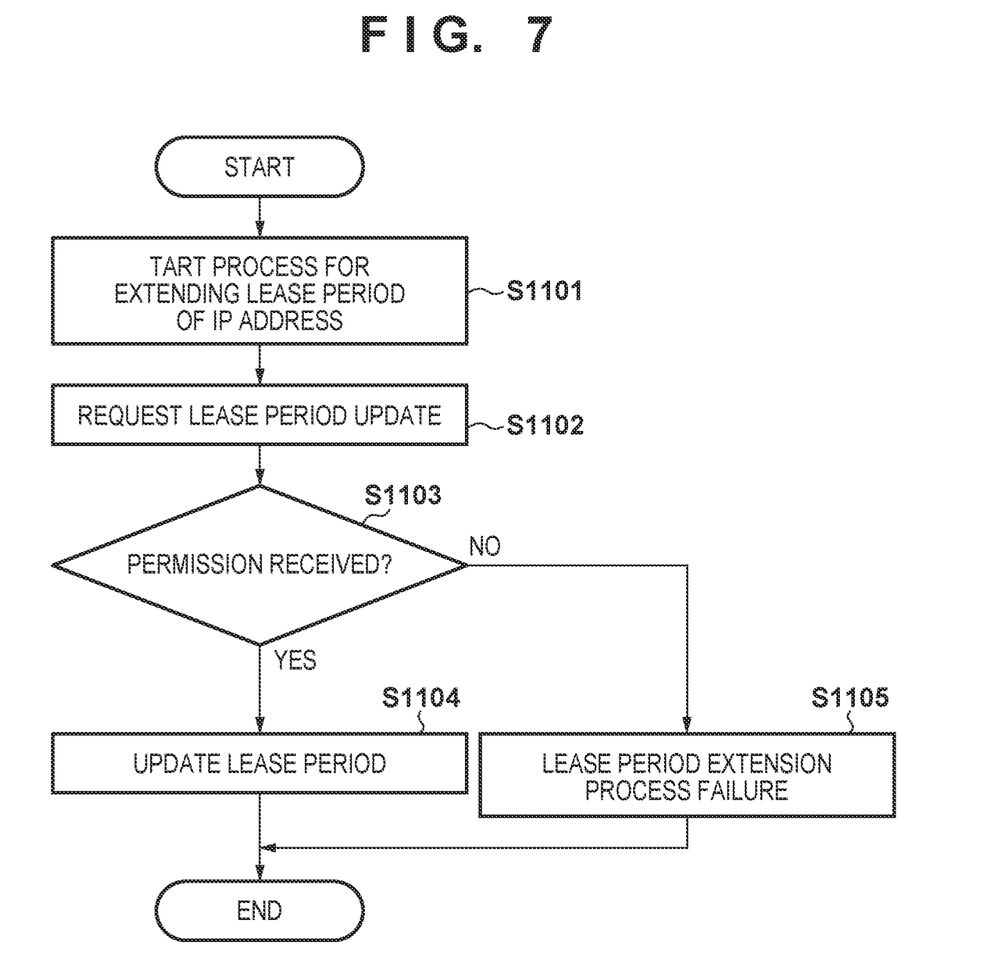
FIG. 7 is a flowchart illustrating a processing sequence performed by the MFP according to an embodiment.

Next, a processing sequence carried out by the MFP 100 in the case of executing a process for extending the lease period of an IP address obtained from the DHCP server 110, according to the present embodiment, will be described with reference to FIG. 7. The processing described hereafter is realized by, for example, the CPU 201 loading a program stored in the HDD 205 into the DRAM 202 and executing that program.

In S1101, the CPU 201 starts the process for extending the lease period of the IP address. Specifically, the DHCP control unit 303 starts the process for extending the lease period by detecting that a pre-set time has been reached, on the basis of the lease period of the IP address stored in S1006. In the case where the lease period is 6,000 seconds, for example, the pre-set time may be set to a percentage corresponding to 0.875 of the lease period, or in other words, 5,250 seconds from the start of the lease. In other words, the pre-set time is set to a time before the stored lease period ends.

Next, in S1102, the CPU 201 transmits a DHCPREQUEST to the DHCP server 110 as a lease period update request. Then, in S1103, the CPU 201 determines whether or not a DHCPACK has been received as a notification that the extension is permitted. In the case where the DHCPACK is received, the process moves to step S1104, whereas in the case where the DHCPACK is not received, the process moves to step S1105. Here, the DHCPACK not being received indicates that the lease period has ended before the DHCPACK serving as the permission notification has been received.

In S1104, the CPU 201 stores the new lease period included in the DHCPACK in the HDD 205, and ends the lease period extension process. When the pre-set time for the lease period is reached again, the process is started again from S1101, and the lease period can therefore continue to be extended as long as permitted by the DHCP server 110.

On the other hand, in S1105, the CPU 201 detects that the lease period extension has failed. In the case where the lease period extension has failed, the lease period is assumed to have ended, and the process for obtaining an IP address through DHCP is executed from S1001 in FIG. 6. For example, in the case where the DHCP server 110 is down and the setting item 402 could not be set for releasing the IP address, the same IP address continues to be used even after the lease period has ended.

As described thus far, in the case where the obtainment of an IP address assigned by a server device has failed, the information processing apparatus according to the present embodiment switches control depending on whether or not a setting for releasing the previously-obtained IP address is set. Specifically, if the stated setting is set, the information processing apparatus releases the previously-obtained IP address and ends the processing in a state where the network initialization has failed. On the other hand, if the stated setting is not set, the previously-obtained IP address continues to be used, and thus that IP address is set in the network I/F. The stated setting is carried out in response to a user operation made through the network settings screen 401 illustrated in FIG. 4, for example. Additionally, in the case where the IP address obtainment fails and the previously-obtained IP address continues to be used, the information processing apparatus notifies the user thereof. In this manner, with the information processing apparatus, the user can set whether or not to reuse an IP address successfully obtained the previous time having taken into consideration the connection state with the DHCP server 110. By operating in accordance with this setting, print jobs can continue to be accepted successfully even in the case where the IP address obtainment has failed.

Second Embodiment

Hereinafter, a second embodiment of the present invention will be described. The present embodiment will describe control for switching whether to continue using an IP address or release the IP address in accordance with the reason for failing to obtain an IP address from the DHCP server 110. The configuration described in the foregoing first embodiment with reference to FIGS. 1 to 5 is the same in the present embodiment, and thus descriptions thereof will be omitted.

Obtainment Process

Figure 8:
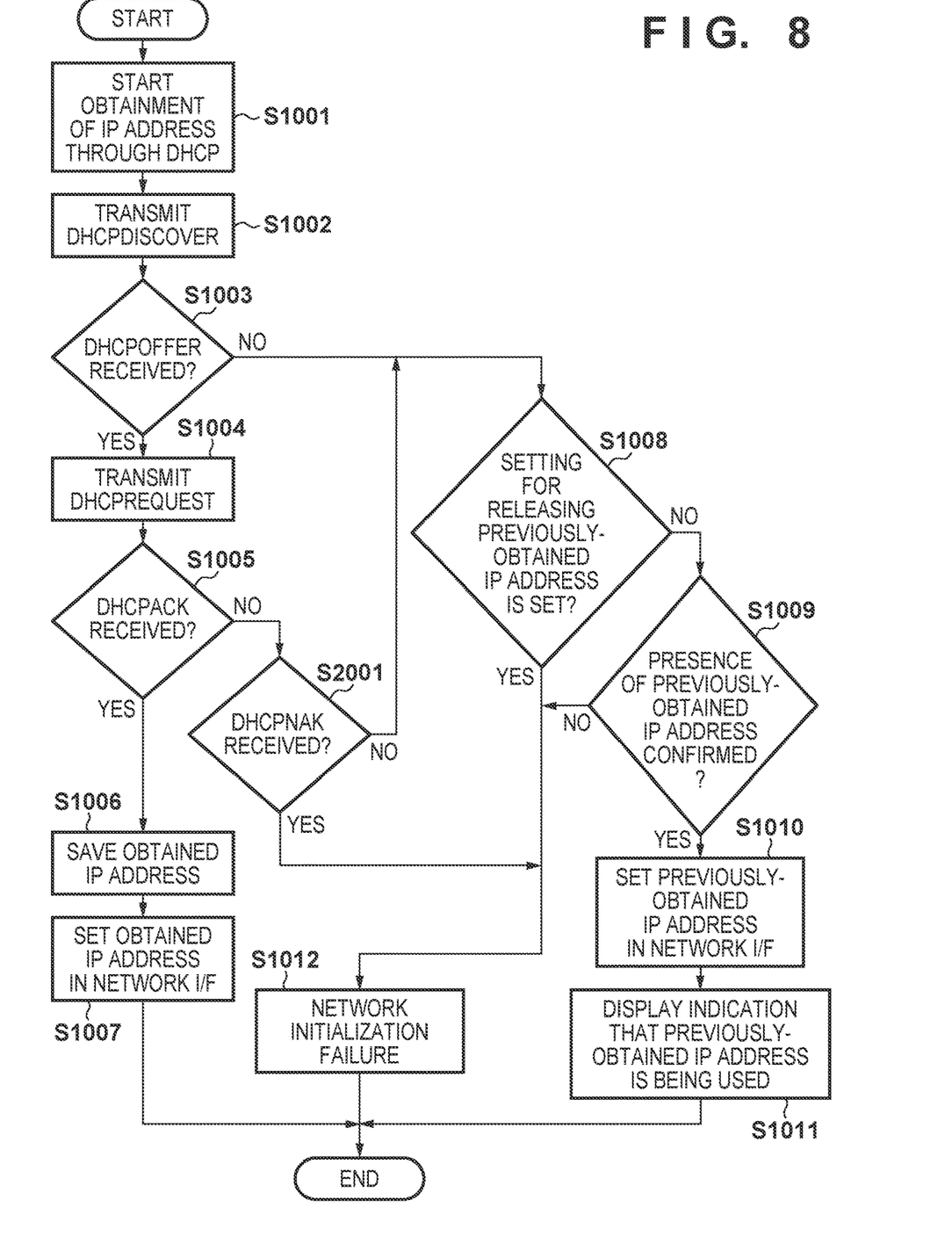
FIG. 8 is a flowchart illustrating a processing sequence performed by the MFP according to an embodiment.

A processing sequence according to the present embodiment, carried out by the MFP 100 in the case where an IP address is obtained utilizing DHCP, will be described with reference to FIG. 8. The processing described hereafter is realized by, for example, the CPU 201 loading a program stored in the HDD 205 into the DRAM 202 and executing that program. Additionally, DHCPDISCOVER, DHCPOFFER, DHCPREQUEST, DHCPACK, and DHCPNAK used in the drawings and the descriptions are all network packets defined in RFC 2131 as Request for Comments. Control that is the same as that in the flowchart of FIG. 6 will be given the same reference numerals and descriptions thereof will be omitted.

Upon determining that the DHCPACK could not be received in S1005, the process advances to S2001, where the CPU 201 determines whether or not a DHCPNAK has been received as a rejection notification in response to the DHCPREQUEST. In the case where the DHCPNAK has been received, the process moves to step S1012, whereas in the case where the DHCPNAK has not been received, the process moves to step S1008. In the case where the DHCPNAK has been received, communication with the DHCP server 110 can be carried out normally, and thus the CPU 201 does not continue to use the IP address successfully obtained the previous time. However, the DHCPNAK not being received indicates that a pre-set standby time has passed, and thus the CPU 201 can confirm that communication cannot be carried out with the DHCP server 110 normally. The CPU 201 therefore continues to use the IP address.

Accordingly, in S1012, the CPU 201 determines that the IP address assignment has failed, interrupts the process of obtaining an IP address, releases the previously-obtained IP address, and ends the process. Meanwhile, in S1008, the CPU 201 obtains, from the HDD 205, a setting value corresponding to the setting item 402, which is a setting made in the case where the IP address obtainment has failed. The CPU 201 then determines whether or not the setting is a setting for releasing the previously-obtained IP address. The processing following thereafter is the same as in the flowchart of FIG. 6, and thus descriptions thereof will be omitted.

As described thus far, with the MFP 100 according to the present embodiment, the user can set whether or not to reuse an IP address successfully obtained the previous time having taken into consideration the connection state with the DHCP server 110. By operating in accordance with this setting, print jobs can continue to be accepted successfully even in the case where the IP address obtainment has failed. Furthermore, according to the present embodiment, whether or not normal communication is possible is determined on the basis of whether or not the rejection notification has been received from the DHCP server 110. The use of the previously-obtained IP address is limited regardless of the stated setting in the case where communication is successfully being carried out normally. A situation in which a plurality of devices operate with overlapping and identical IP addresses can be effectively avoided as a result.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154024 filed on Aug. 4, 2016, which is hereby incorporated by reference herein in its entirety.

What is claimed is:

1. An information processing apparatus that uses an IP address obtained from a DHCP server, the apparatus comprising:
a network interface;
a memory storing instructions;
a processor configured to implement the instructions and execute a plurality of tasks, including:
a setting task that sets whether or not to release an IP address, as an operation setting of the information processing apparatus, in accordance with a user operation, wherein the operation setting is used when the IP address cannot be obtained from the DHCP server;
an obtaining task that obtains an IP address from the DHCP server;
a determination task that, in a case where the obtaining task fails to currently obtain an IP address from the DHCP server, determines whether or not to continue using an IP address that was previously obtained by the obtaining task and previously used, on the basis of the operation setting in the information processing apparatus; and
an interface control task that releases the previously obtained IP address and assigned to the network interface in response to the determination task determining not to continue using the previously obtained IP address, in a case where the obtaining task fails to currently obtain an IP address from the DHCP server.

2. The information processing apparatus according to claim 1, wherein the case where the obtaining task fails to currently obtain the IP address from the DHCP server is a case where the information processing apparatus has not received a DHCPOFFER from the DHCP server.

3. The information processing apparatus according to claim 1, wherein the case where the obtaining task fails to currently obtain the IP address from the DHCP server is a case where the information processing apparatus has not received a DHCPACK from the DHCP server.

4. The information processing apparatus according to claim 1, the plurality of tasks include a notification task that, in a case where the determination task has determined to continue using the IP address previously used, notifies a user that the IP address previously used continues being used.

5. The information processing apparatus according to claim 4, wherein the notifying task displays a message indicating that the IP address previously used continues being used.

6. The information processing apparatus according to claim 5, wherein:
the information processing apparatus is a printing apparatus having at least a copy function,
the information processing apparatus displays a menu screen including at least a copy icon for a user to utilize the copy function, and
the message is displayed in at least a predetermined area of the menu screen.

7. The information processing apparatus according to claim 1, wherein the information processing apparatus is a printing apparatus.

8. A method of controlling an information processing apparatus that uses an IP address obtained from a DHCP server and includes a network interface, the method comprising:
setting whether or not to release an IP address, as an operation setting of the information processing apparatus, in accordance with a user operation, wherein the operation setting is used when the IP address cannot be obtained from the DHCP server;

obtaining an IP address from the DHCP server;

determining, in a case where the obtaining of the IP address from the DHCP server fails to currently obtain the IP address from the DHCP server, whether or not to continue to use an IP address that was previously obtained by the obtaining of the IP address from the DHCP server and previously used, on the basis of the operation setting in the information processing apparatus; and releasing the previously obtained IP address and assigned to the network interface in response to the determining of whether or not to continue to use the IP address determining not to continue using the previously obtained IP address, in a case where the obtaining of the IP address from the DHCP server fails to currently obtain an IP address from the DHCP server.

9. The method according to claim 8, wherein the case where the obtaining of the IP address fails to currently obtain the IP address from the DHCP server is a case where the information processing apparatus has not received a DHCPOFFER from the DHCP server.

10. The method according to claim 8, wherein the case where the obtaining of the IP address fails to currently obtain the IP address from the DHCP server is a case where the information processing apparatus has not received a DHCPACK from the DHCP server.

11. The method according to claim 8, further comprising notifying, in a case where the determining of whether or not to continue using the IP address has determined to continue using the IP address previously used, a user that the IP address previously used continues being used.

12. The method according to claim 11, wherein the notifying of the user displays a message indicating that the IP address previously used continues being used.

13. The method according to claim 12, wherein:

the information processing apparatus is a printing apparatus having at least a copy function, the information processing apparatus displays a menu screen including at least a copy icon for a user to utilize the copy function, and the message is displayed in at least a predetermined area of the menu screen.

14. The method according to claim 8, wherein the information processing apparatus is a printing apparatus.

15. A non-transitory computer-readable storage medium storing a computer program executable by a computer to execute a method of controlling an information processing apparatus that uses an IP address obtained from a DHCP server and includes the network interface, the method comprising:

setting whether or not to release an IP address, as an operation setting of the information processing apparatus, in accordance with a user operation, wherein the operation setting is used when the IP address cannot be obtained from the DHCP server;

obtaining an IP address from the DHCP server;

determining, in a case where the obtaining of the IP address from the DHCP server fails to currently obtain the IP address from the DHCP server, whether or not to continue using an IP address that was previously obtained by the obtaining of the IP address from the DHCP server and previously used, on the basis of the operation setting in the information processing apparatus; and releasing the previously obtained IP address and assigned to the network interface in response to the determining of whether or not to continue to use the IP address determining not to continue using the previously obtained IP address, in a case where the obtaining of the IP address fails to currently obtain an IP address from the DHCP server.

* * * * *